(12) United States Patent
Harllee, III et al.

(10) Patent No.: US 9,281,008 B1
(45) Date of Patent: Mar. 8, 2016

(54) MULTIPLE TRACK PITCHES FOR SMR

(71) Applicant: Seagate Technology LLC, Cupertino, CA (US)

(72) Inventors: Peter S Harllee, III, Boulder, CO (US); Kurt C Wiesen, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/803,029

(22) Filed: Mar. 14, 2013

Related U.S. Application Data

(60) Provisional application No. 61/712,248, filed on Oct. 10, 2012.

(51) Int. Cl.
*G11B 20/12* (2006.01)
*G11B 20/00* (2006.01)

(52) U.S. Cl.
CPC ...... *G11B 20/1217* (2013.01); *G11B 20/00601* (2013.01)

(58) Field of Classification Search
CPC ............ G11B 20/1217; G11B 20/10212; G11B 20/00601; G11B 19/128; G11B 20/00405
USPC ................... 360/39, 48, 55, 47, 260
See application file for complete search history.

(56) References Cited

U.S. PATENT DOCUMENTS

| | | | |
|---|---|---|---|
| 7,231,497 B2 | 6/2007 | Trika | |
| 7,440,221 B2 | 10/2008 | Tsuchinaga | |
| 7,965,465 B2 | 6/2011 | Sanvido | |
| 7,966,456 B2 | 6/2011 | Trika | |
| 7,970,989 B2 | 6/2011 | Matthews | |
| 7,982,994 B1 | 7/2011 | Erden | |
| 8,179,627 B2 | 5/2012 | Chang | |
| 8,270,256 B1 | 9/2012 | Juang | |
| 8,300,341 B2 | 10/2012 | Itakura | |
| 8,310,786 B2 | 11/2012 | Fuente | |
| 8,625,215 B1* | 1/2014 | Burd | 360/31 |
| 2005/0071537 A1* | 3/2005 | New | G06F 3/0608 711/100 |
| 2005/0144396 A1 | 6/2005 | Eschmann | |
| 2007/0223132 A1* | 9/2007 | Tsuchinaga | G11B 20/1258 360/75 |
| 2010/0265612 A1* | 10/2010 | Jaquette | G11B 5/00817 360/48 |
| 2011/0085266 A1 | 4/2011 | Kanai | |
| 2011/0138106 A1 | 6/2011 | Prabhakaran | |

(Continued)

OTHER PUBLICATIONS

Design Issues for a Shingled Write Disk System, Ahmed Amer, et al.; © 2010 IEEE.

(Continued)

*Primary Examiner* — Thomas Alunkal

(74) *Attorney, Agent, or Firm* — Cesari & Reed, LLP; Kirk A. Cesari

(57) ABSTRACT

Systems and methods are disclosed for improving performance in data storage devices, particularly devices employing shingled magnetic recording. In one embodiment, an apparatus may comprise a data storage medium having multiple tracks with multiple track pitches. In another embodiment, a method may comprise formatting a data storage memory with a first track having a first track pitch, and formatting the data storage memory with a second track having a second track pitch. The method may further comprise formatting the computer readable data storage memory with a set of tracks including the first track arranged to store data in a shingled manner where one track at least partially overlaps an adjacent track, and the second track separating the set of tracks from a third track.

12 Claims, 4 Drawing Sheets

(56) References Cited

U.S. PATENT DOCUMENTS

| | | |
|---|---|---|
| 2011/0292545 A1 | 12/2011 | Katada |
| 2011/0299373 A1 | 12/2011 | Ho |
| 2012/0060073 A1 | 3/2012 | Itakura |
| 2012/0069466 A1 | 3/2012 | Okamoto |
| 2012/0099216 A1 | 4/2012 | Grobis |
| 2012/0162808 A1 | 6/2012 | Masuda |
| 2012/0194937 A1 | 8/2012 | Tagami |
| 2012/0212847 A1 | 8/2012 | Sato |
| 2012/0233432 A1 | 9/2012 | Feldman |
| 2012/0250174 A1* | 10/2012 | Sueishi .............. G11B 20/1217 360/31 |
| 2012/0300328 A1 | 11/2012 | Coker |
| 2012/0300333 A1 | 11/2012 | Tinker |
| 2012/0303867 A1 | 11/2012 | Hall |
| 2012/0303884 A1 | 11/2012 | Hall |
| 2012/0303889 A1 | 11/2012 | Coker |
| 2012/0303928 A1 | 11/2012 | Hall |
| 2012/0307400 A1 | 12/2012 | Kawabe |
| 2013/0027802 A1 | 1/2013 | Kim |
| 2013/0027806 A1 | 1/2013 | Cho |
| 2013/0031296 A1 | 1/2013 | Na |
| 2013/0031306 A1 | 1/2013 | Kim |
| 2013/0031317 A1 | 1/2013 | Ryu |
| 2013/0031406 A1 | 1/2013 | Cho |
| 2013/0038960 A1 | 2/2013 | Song |
| 2013/0038961 A1 | 2/2013 | Song |
| 2013/0063836 A1* | 3/2013 | Bui ........................ G11B 5/584 360/66 |
| 2013/0170061 A1* | 7/2013 | Saito ..................... G11B 5/024 360/39 |
| 2013/0318295 A1* | 11/2013 | Kojima ............ G11B 20/10009 711/112 |
| 2013/0342929 A1* | 12/2013 | Coker ................ G11B 5/59627 360/31 |

OTHER PUBLICATIONS

Emulating a Shingled Write Disk, Rekha Pitchumani, et al., International Symposium on Modeling, Analysis, and Simulation of Computer and Telecommunication Systems, At Washington, DC (Aug. 2012).

* cited by examiner

MULTIPLE TRACK PITCHES FOR SMR

CROSS REFERENCE TO RELATED APPLICATIONS

The present application claims priority to U.S. provisional patent application Ser. No. 61/712,248, filed Oct. 10, 2012, entitled "Multiple Track Pitches for SMR," the contents of which are hereby incorporated by reference in their entirety.

BACKGROUND

The present disclosure relates to data storage mediums, and provides systems and method for improving data storage device performance, especially when using shingled magnetic recording.

SUMMARY

In one embodiment, an apparatus may comprise a data storage medium having multiple tracks with multiple track pitches.

In another embodiment, a method may comprise formatting a data storage memory with a first track having a first track pitch, and formatting the data storage memory with a second track having a second track pitch.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
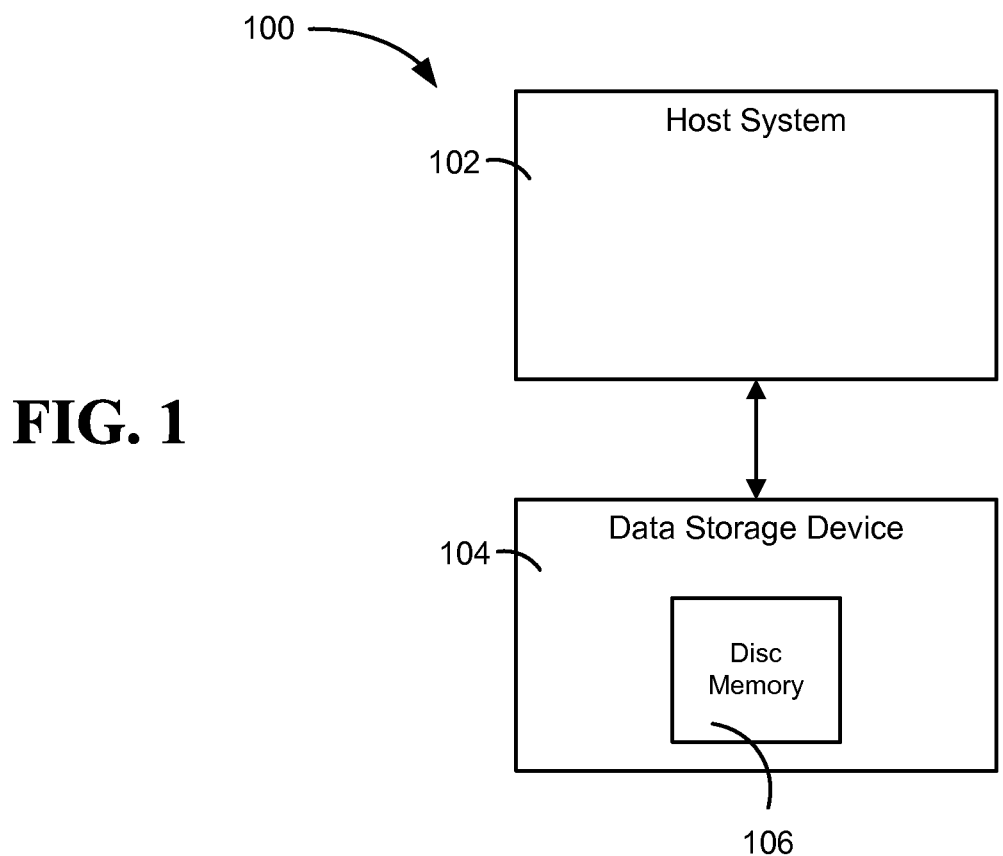
FIG. 1 is a diagram of an illustrative embodiment of a system with multiple track pitches for shingled magnetic recording (SMR)

FIG. 1 depicts an embodiment of a system with multiple track pitches for shingled magnetic recording (SMR), generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be divided into multiple zones, each with a plurality of tracks. Each track can be further divided into a plurality of logical block addresses (LBAs), with chunks of data written to each LBA. Each zone may have different configurations of various options, such as data track format, direction of writing from a transducer, data density, or intended uses. For example, a disc may have a zone designated as a media cache intended for sequential storage of data in a non-shingled track manner. The disc may also have one or more zones designated for data storage in a shingled track manner using shingled magnetic recording (SMR) as discussed below. The disc may further have at least one zone designated for spare sectors.

In an embodiment of system 100, the disc memory 106 has one or more zones configured to store data on shingled data tracks using SMR. SMR is a recording method used to increase data recording density on a disc, whereby a track of data partially overlaps an adjacent data track. SMR will be discussed in more detail with regard to FIGS. 2-4.

Figure 2:
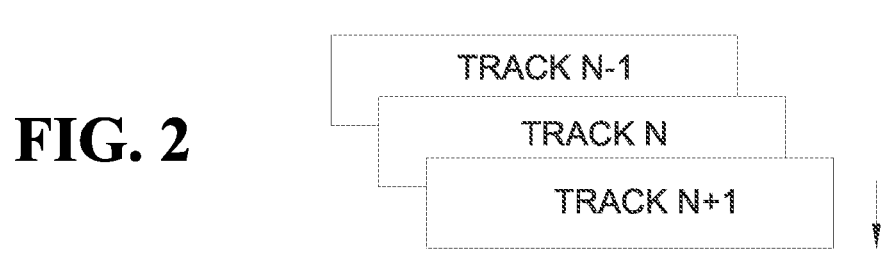
FIG. 2 is a diagram of another illustrative embodiment of a system with multiple track pitches for SMR.

SMR is a scheme of executing a write operation in one radial direction across a disc (i.e. tracks are written one at a time moving from the inner diameter towards the outer diameter, or vice-versa), where tracks partially overlap each other similar to roofing shingles. Referring to FIG. 2, if it is assumed that writing is performed in the arrow-indicated direction in the shingle-write scheme, when writing to track N, adjacent track N-1 is partially overwritten. Similarly, when writing is performed on track N+1, adjacent track N is partially overwritten. In contrast to recording methods where each track is written without any overlap, SMR may result in increased recording density due to a higher tracks per inch (TPI) characteristic in a radial direction of a storage medium.

Figure 3:
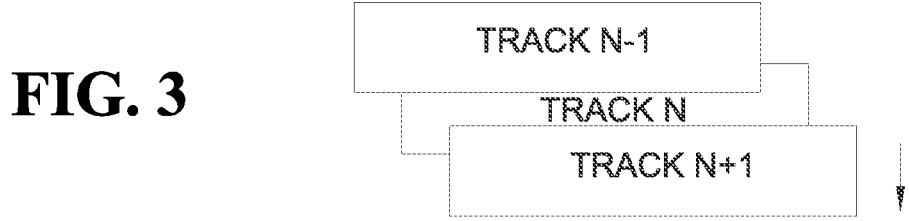
FIG. 3 is a diagram of another illustrative embodiment of a system with multiple track pitches for SMR.

SMR can generate flux in one direction. As illustrated in FIG. 3, after writing on track N, if track N-1 is written in a reverse direction of the shingled recording direction, track N may become unreadable due to Adjacent Track Interference (ATI). Therefore, it may be advantageous to follow a constraint that track N-1 should not be written after track N is written. Therefore, writing or modifying data on track N-1 after track N is recorded, or on track N after track N+1 is recorded, requires a different writing strategy than with non-shingled tracks, which can simply be overwritten at any time.

Figure 4:
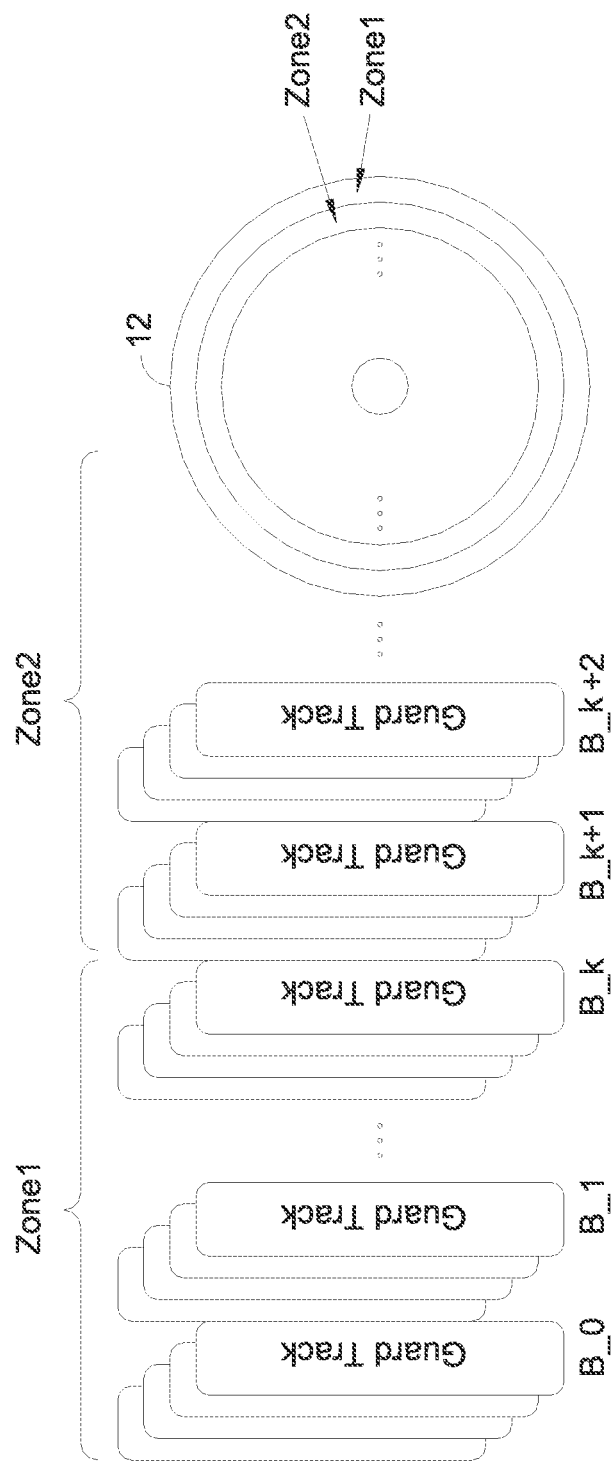
FIG. 4 is a diagram of another illustrative embodiment of a system with multiple track pitches for SMR.

Turning now to FIG. 4, a diagram of another illustrative embodiment of a system with multiple track pitches for SMR is depicted. Rotating disc media 12 may be divided into a plurality of zones (e.g. Zone 1, Zone 2, etc.), and each zone may contain a plurality of data tracks.

Due to the single-write direction of SMR, writing a given track N-1 after track N has been written may require rewriting all shingled tracks that following track N-1 (i.e. track N, track N+1, track N+2, etc.). In order to accomplish this realistically, a set of tracks may be grouped into a "band," with the band ending with a guard track. In some embodiments, the guard track can be a spacer or non-shingled track (i.e. a track used to prevent data written to a band from overlapping tracks in an adjacent band), or a shingled track which is not used to store data. When track N−1 needs to be re-written, tracks N−1 to the Guard Track can be rewritten, while tracks in other bands are not affected. Accordingly, the tracks in each zone may be divided into a plurality of bands. As depicted in FIG. 4, Zone 1 contains Band 0 (B_0) through Band k (B_k), while Zone 2 contains Band k+1 (B_k+1), Band k+2 (B_k+2), etc. In an example embodiment, each zone may contain 100 data tracks, and the 100 data tracks are divided into 10 bands containing 10 tracks each.

Figure 5:
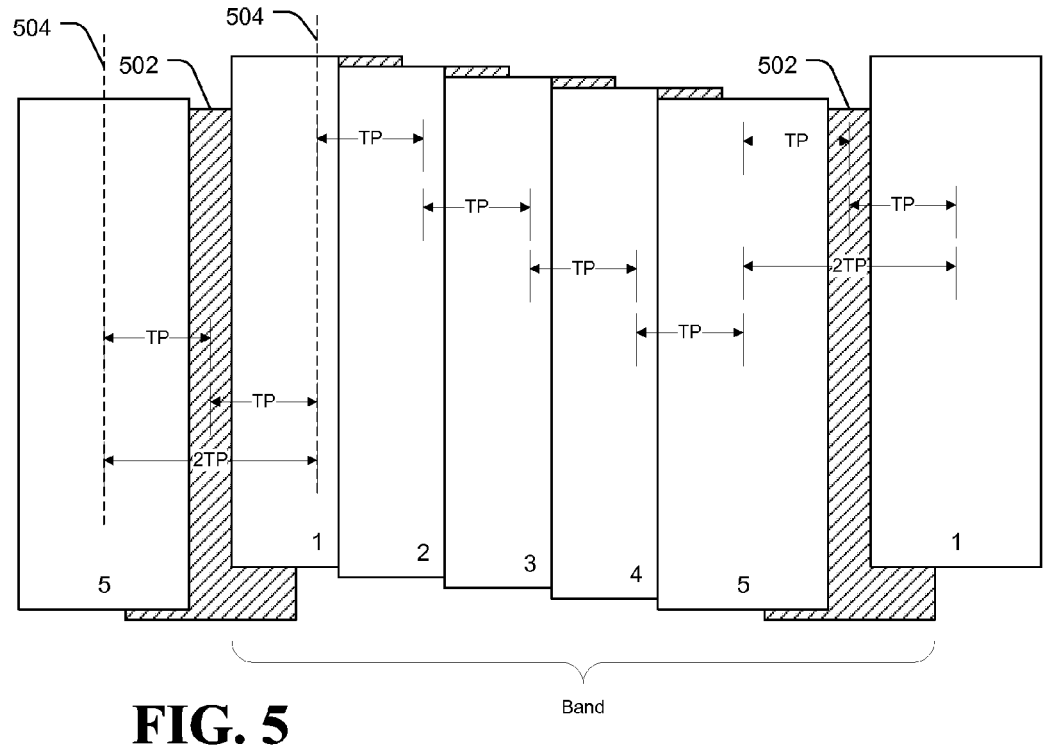
FIG. 5 is a diagram of another illustrative embodiment of a system with multiple track pitches for SMR.

Turning now to FIG. 5, a diagram of another illustrative embodiment of a system with multiple track pitches for SMR is depicted. Data tracks can be formatted with multiple different track pitches (TP) or "widths," where a track pitch may be the distance between center lines or write centers 504 of adjacent tracks. In the depicted embodiment of FIG. 5, both the tracks used to record data (labeled 1 to 5 in FIG. 5) as well as the guard tracks 502 have the same TP.

In some embodiments, a band may comprise tracks with multiple track pitches. For example, a first track pitch may be used for tracks inside of a shingled recording band used to store data. A second track pitch may be used for a guard track 502 between bands, which is not used to store data. Both track pitches may be a fraction of a non-shingled (nominal) track pitch.

If the guard track 502 has the same track pitch as the data tracks, as in FIG. 5, the space between writable tracks in adjacent bands (i.e. the distance between the write centers 504 of the last data track of one band and the first data track of the next band) would be 2×TP. Because no data is recorded on the guard tracks, this can result in "wasted space" between the writable tracks of the adjacent bands. In the embodiment of FIG. 5, how much of a given shingled area can be used for storing data can be expressed as N/(N+1), where N is the number of writable tracks in a band. In the example of FIG. 5, each band has 5 writable tracks, so ⅚th of the banded disk space can be used to store data, or 83.3%.

Figure 6:
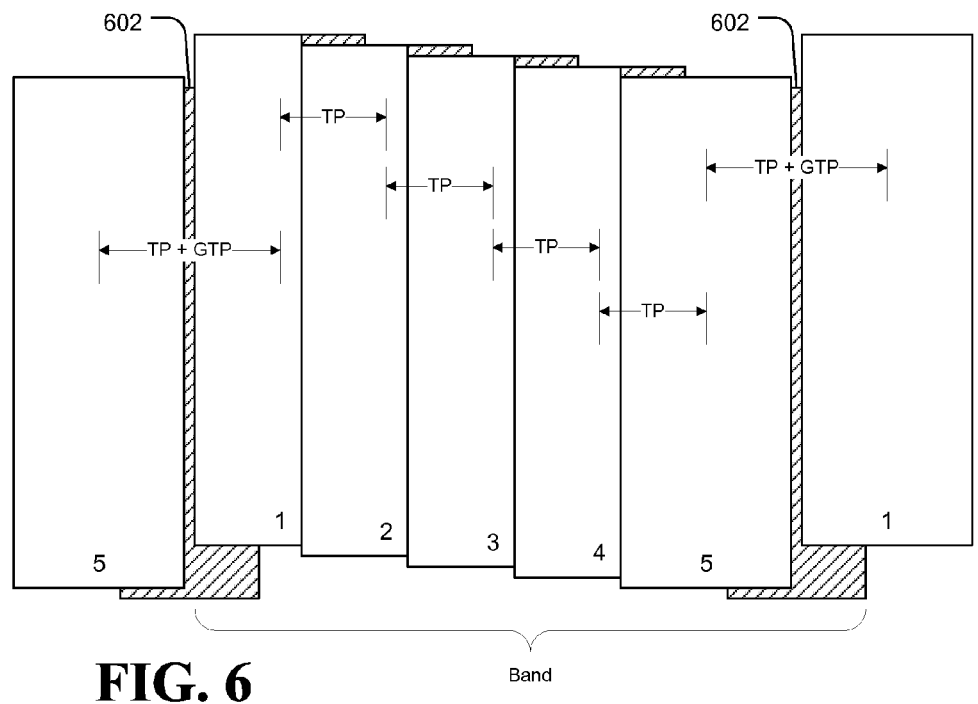
FIG. 6 is a diagram of another illustrative embodiment of a system with multiple track pitches for SMR.

Turning now to FIG. 6, a diagram of another illustrative embodiment of a system with multiple track pitches for SMR is depicted. Instead of using a guard track between bands with the same TP as the data tracks, as in FIG. 5, the next band can be offset by a fraction of a shingled track TP by using two different track pitches in a zone. A reduced guard track pitch (GTP) can provide improved density and performance, such as in shingled magnetic recording (SMR) media with a small number of tracks per band. So in contrast to FIG. 5, where the distance between writable tracks of adjacent bands is 2TP, the distance between writable tracks in adjacent bands is TP+GTP, which is less than 2TP. In the embodiment of FIG. 6, how much of a given shingled area can be used for storing data can be expressed as N/(N+(GTP/TP)), where N is the number of writable tracks in a band. When GTP is equal to TP and each band has 5 writable tracks, ⅚th of the banded disk space can be used to store data, as in FIG. 5. However, when GTP is 75% of the width of TP, 5/(5+0.75)=5/5.75, or 87% of the banded disk space can be used to store data.

In an example embodiment, the GTP may be set to 2(TPds−TPss), where TPds is a double-sided track pitch, and TPss is a single-sided track pitch, both as determined with a variable bit aspect ratio (VBAR) test. TPds may be the track pitch at which the head could run in a conventional drive, while TPss may be the track pitch in a shingled drive. A metric (such as squeezed error rate) can be measured under double sided conditions, and TPds set to the track pitch at which the metric meets a threshold. The same metric could be measured under single sided conditions and the TPss set when the metric meets the same threshold. These values may be determined during the drive manufacturing process.

Using a fractional track 602 for a guard space maximizes the areal density gain from shingling a zone by allowing the band isolation to be the minimum amount necessary to meet a target bit error rate (BER) on adjacent data storage tracks. For example, when data is written to the last track of a band before the guard track, a BER could be measured on the first track of the next adjacent band. The GTP can be set to the minimum necessary to meet the target BER on the first track of the adjacent band.

In another embodiment, it may be desirable to have a guard track that has a wider pitch than (i.e. greater than) the TP of the data tracks, for example depending on the level of shingled overlap, the writing characteristics of the writing head, etc. Two or more guard tracks with the same TP as the data tracks could be employed, but that may provide a larger guard space than necessary. A single guard track with a pitch wider than the data track TP, but less than two TP could be employed. For example, a guard track with a track pitch GTP could be employed, where TP<GTP<2TP. Depending on the desired guard space, the GTP could be less than 2TP, 3TP, etc., or any other required pitch. In one embodiment, the GTP may be set based on a ratio of the double-sided track pitch to the single sided track pitch (TPds/TPss). If the ratio is less than one, then the guard space may be set to approximately one track wide. If the ratio is between 1 and 2, then the guard space may be set to approximately two tracks wide, approximately three tracks wide if the ratio is between 2 and 3, etc.

Additional embodiments of storage media with different track pitches are also possible. For example, non-shingled tracks may have greater track pitch than shingled tracks. In some embodiments, as described above, a disc may be divided into a plurality of zones, with some zones including non-shingled tracks, and other zones further divided into bands of shingled tracks. For example, a disc could have a zone designated as a media cache with non-shingled tracks having a first track pitch, allowing for any track in the media cache to be written without the constrains of SMR write operations.

In some embodiments, tracks in different zones may have different track pitches, such as zones near the inner diameter (ID) of a disc having different track pitches than zones near the outer diameter (OD). For example, particularly sensitive or important data could be stored in a zone with a greater track pitch and greater data reliability at the cost of lower data storage density. Similarly, less important data could be stored to a zone with a lower track pitch.

Further, in some embodiments tracks within a zone may have different track pitches. For example, shingled tracks within a band used for storing data may have a first track pitch, while the guard tracks between bands may have a second track pitch which is a reduced track pitch from the first track pitch. This arrangement can improve areal recording density of a storage medium by reducing the space occupied by non-data storing guard tracks while still providing an adequate buffer between adjacent bands to reduce or eliminate ATI. In other embodiments, even within a single band, a number of the data-storing shingled tracks may have a first track pitch, and other shingled tracks may have a second, greater track pitch, and the guard band could have a third lesser track pitch. Greater (i.e. wider) track pitches may provide more reliable data storage for important data, while lesser (i.e. narrower) track pitches can provide greater data storage density for less vital data.

Figure 7:
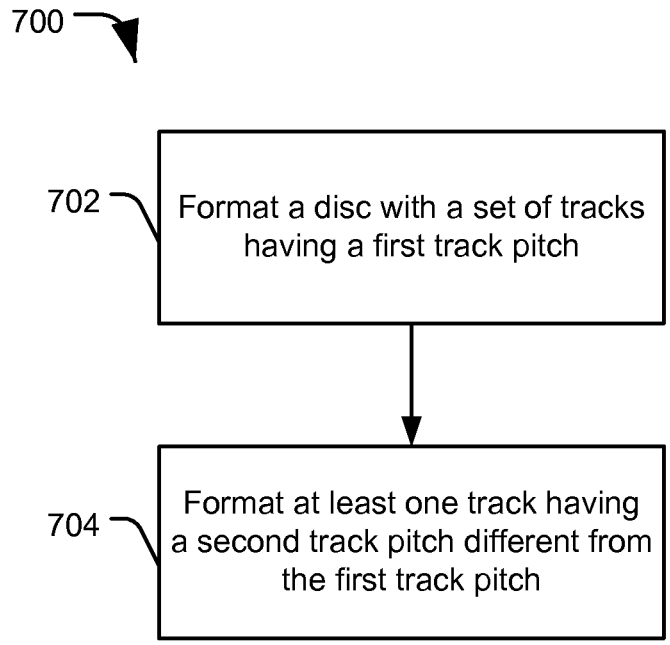
FIG. 7 is a flowchart of an illustrative embodiment of a method for formatting storage media with multiple track pitches for SMR.

FIG. 7 is a flowchart of an illustrative embodiment of a method for formatting storage media with multiple track pitches, generally designated 700. The method 700 involves formatting a disc storage medium with a set of data tracks having a first track pitch, at 702. In one embodiment, the set of tracks may be one or more zones of the disc formatted with a first track pitch. In another embodiment, the set of tracks may be data tracks in a shingled band.

The method 700 next involves formatting at least one track having a second track pitch different from the first track pitch, at 704. In one embodiment, the at least one track may be a zone of a disc. For example, the set of tracks from 702 may be a number of shingled data storage zones, while the at least one track of 704 may be a non-shingled data storage zone. In another embodiment, the at least one track may be a guard track in a shingled recording band, formatted to have a lower track pitch than the shingled data storage tracks to increase a tracks-per-inch characteristic of the disc. In some embodiments, additional tracks with a third track pitch may be formatted on the disc. Multiple track pitches can allow for shingled and non-shingled recording methods on the same disc, as well as both shingled and non-shingled tracks of different pitches for considerations of reliability, storage density, etc.

Figure 8:
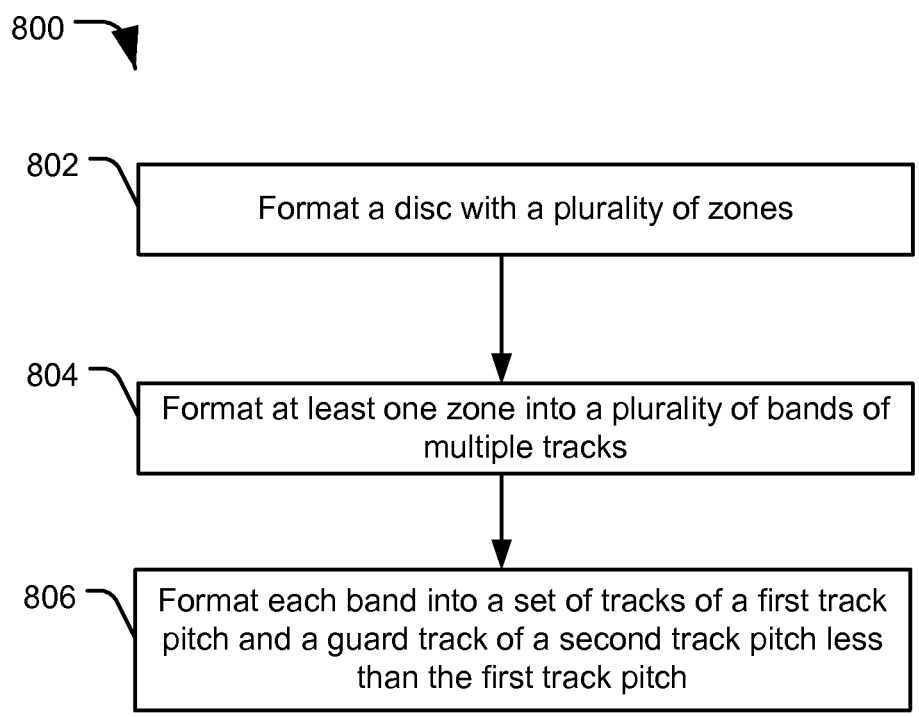
FIG. 8 is a flowchart of yet another illustrative embodiment of a method for formatting storage media with multiple track pitches for SMR.

FIG. 8 is a flowchart of yet another illustrative embodiment of a method for formatting storage media with multiple track pitches for SMR, generally designated 800. The method 800 may involve formatting a disc with a plurality of zones, at 802. For example, the disc may be formatted with a plurality of shingled data zones to store user data, and a non-shingled media cache zone used to temporarily store data.

The method 800 may involve formatting at least one zone into a plurality of bands of multiple tracks, at 804. For example, at least one zone may be formatted into a plurality of bands for shingled magnetic recording, as discussed herein. The method 800 may also involve formatting each band into a set of tracks of a first track pitch, and a guard track of a second track pitch less than the first track pitch, at 806. By providing a guard track with a lesser track pitch, a disc areal space occupied by non-data storing space between shingled bands can be greatly reduced.

While many of the examples and embodiments disclosed herein are directed toward shingled magnetic recording, multiple track pitches can be employed in non-shingled media as well. The devices and methods disclosed can be used in any storage device, for example in DSDs where multiple track pitches for varied data reliability, different writing methods, or other considerations would be beneficial. For example, a DSD may have shingled zones and non-shingled zones, with non-shingled zones having a first track pitch, data tracks of the shingled zones having a second track pitch, and guard tracks of the shingled zones having a third track pitch.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a data storage medium having multiple tracks arranged in a shingled manner, the multiple tracks having multiple track pitches and the multiple tracks include:
        a first track having a first track pitch to a second track adjacent the first track, the second track overlapping the first track, both the first and second track are tracks to store data; and
        a third track having a second track pitch to a fourth track adjacent the third track, the third track overlapping the fourth track, both the third and fourth tracks are tracks to store data; and
        a fifth track that separates the first track from the third track, the fifth track is a spacer to prevent data written to the third track from overlapping the first track, the fifth track having a third track pitch to the first track and having a fourth track pitch to the third track, the third track pitch is less than the first track pitch and the fourth track pitch is less than the second track pitch.

2. The apparatus of claim 1 further comprising the data storage medium including:
    a first band of tracks including multiple adjacent tracks that at least partially overlap;
    a second band of tracks including multiple adjacent tracks that at least partially overlap;
    the first band of tracks including the first track; and
    the fifth track positioned to separate the first band of tracks from the second band of tracks.

3. The apparatus of claim 2 further comprising:
    the data storage medium includes a plurality of zones and at least one zone includes the first band and the second band.

4. The apparatus of claim 1 further comprising
    the data storage medium is a disc data storage medium and includes:
        a shingled zone having the multiple tracks; and
        a non-shingled zone having a plurality of non-shingled tracks.

5. A method comprising:
    formatting a data storage memory with tracks arranged to store data in a shingled manner, including:
        a first track having a first track pitch to a second track adjacent the first track, the second track overlapping the first track, both the first and second track are tracks to store data; and
        a third track having a second track pitch to a fourth track adjacent the third track, the third track overlapping the fourth track, both the third and fourth tracks are tracks to store data; and
        a fifth track that separates the first track from the third track, the fifth track is a spacer to prevent data written to the third track from overlapping the first track, the fifth track having a third track pitch to the first track and having a fourth track pitch to the third track, the third track pitch is less than the first track pitch and the fourth track pitch is less than the second track pitch.

6. The method of claim 5 further comprising selecting the third track pitch based on a target bit error rate of the third track.

7. The method of claim 5 further comprising
formatting the data storage memory with a first band of tracks including the first track and second track;
formatting the data storage memory with a second band of tracks including the third track and the fourth track; and
formatting the data storage memory with the fifth track so that the fifth track is positioned to separate the first band of tracks from the second band of tracks.

8. The method of claim 7 further comprising:
formatting the data storage memory to include a plurality of zones, at least one zone including the first band of tracks and the second band of tracks.

9. The method of claim 5 further comprising
formatting the data storage memory with:
a shingled zone having multiple sets of tracks arranged to store data in a shingled manner with one track at least partially overlapping an adjacent track, the shingled zone including:
a first set of tracks including the first track and the second track;
the fifth track separating the first set of tracks from a second set of tracks that include the third track and the fourth track; and
a non-shingled zone having a plurality of non-shingled tracks.

10. The method of claim 5, further comprising setting the third track pitch based on a ratio of a double-sided track pitch to a single sided track pitch.

11. An apparatus comprising:
a data storage device including:
a track-based data storage medium including:
a first band including a first set of multiple tracks arranged in a shingled manner to store recoverable data, the first set of multiple tracks including a first track having a first track pitch in relation to a second track of the first set of multiple tracks, the first track overlapping the second track;
a second band including a second set of multiple tracks arranged in a shingled manner to store recoverable data, the second set of multiple tracks including a third track having a second track pitch in relation to a fourth track of the second set of multiple tracks, the fourth track overlapping the third track;
a fifth track separating the first track from the third track and the fifth track is a spacer area not intended to stored recoverable data and prevents data written to the third track from overlapping the first track; and
the fifth track having a third track pitch in relation to the first track, the third track pitch smaller than the first track pitch; and
the fifth track having a fourth track pitch in relation to the third track, the fourth track pitch is smaller than the second track pitch;
where a track pitch is the distance between center lines of adjacent tracks.

12. The apparatus of claim 11 further comprising the track-based data storage medium is a magnetic disc data storage medium and includes:
a shingled zone including the multiple tracks; and
a non-shingled zone having a plurality of non-shingled tracks of a fourth track pitch that is greater than the first track pitch and greater than the second track pitch.

* * * * *